US012148327B2

(12) United States Patent
Pyo et al.

(10) Patent No.: US 12,148,327 B2

(45) Date of Patent: Nov. 19, 2024

(54) DISPLAY DEVICE

(71) Applicant: LG ELECTRONICS INC., Seoul (KR)

(72) Inventors: Jonggil Pyo, Seoul (KR); Jingyu Kim, Seoul (KR); Kwaneun Jin, Seoul (KR); Jaeyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 17/922,312

(22) PCT Filed: Apr. 29, 2020

(86) PCT No.: PCT/KR2020/005756

§ 371 (c)(1),
(2) Date: Oct. 28, 2022

(87) PCT Pub. No.: WO2021/221216

PCT Pub. Date: Nov. 4, 2021

(65) Prior Publication Data

US 2023/0169895 A1 Jun. 1, 2023

(51) Int. Cl.
*G09F 9/30* (2006.01)

(52) U.S. Cl.
CPC .................................... *G09F 9/301* (2013.01)

(58) Field of Classification Search
CPC ........................................................ G09F 9/301
USPC ...................................................... 361/679.01
See application file for complete search history.

(56) References Cited

U.S. PATENT DOCUMENTS

| | | | | |
|---|---|---|---|---|
| 2006/0017356 | A1 | 1/2006 | Hoss | |
| 2009/0225239 | A1 | 9/2009 | Osada et al. | |
| 2017/0344073 | A1* | 11/2017 | Kang .................... | G06F 1/1679 |

FOREIGN PATENT DOCUMENTS

| | | |
|---|---|---|
| KR | 1020170126061 | 11/2017 |
| KR | 1020190092980 | 8/2019 |
| KR | 1020200030265 | 3/2020 |

OTHER PUBLICATIONS

PCT International Application No. PCT/KR2020/005756, International Search Report dated Jan. 22, 2021, 3 pages.

* cited by examiner

*Primary Examiner* — Binh B Tran
(74) *Attorney, Agent, or Firm* — LEE, HONG, DEGERMAN, KANG & WAIMEY

(57) ABSTRACT

Disclosed is a display device. The display device includes: a flexible display panel; a panel roller which extends long, and around which the display panel is wound, or from which the display panel is unwound; a bottom frame on which the panel roller is rotatably mounted; a first vertical frame which extends long in a direction intersecting a longitudinal direction of the panel roller, and is fixed to the bottom frame; a first lead screw which is parallel to the first vertical frame, and rotatably coupled to the bottom frame; a first support bar located between the first vertical frame and the first lead screw; a first slider which moves in the first lead screw and the support bar, when the first lead screw rotates; and a bar to which a distal end of the display panel is fixed, and which is coupled to the first slider.

10 Claims, 19 Drawing Sheets

DISPLAY DEVICE

CROSS-REFERENCE TO RELATED APPLICATIONS

This application is the National Stage filing under 35 U.S.C. 371 of International Application No. PCT/KR2020/005756, filed on Apr. 29, 2020, the contents of which are all incorporated by reference herein in their entirety.

TECHNICAL FIELD

The present disclosure relates to a display device.

BACKGROUND ART

As the information society has developed, the demand for display device is increasing in various forms, and accordingly, in recent years, various display devices such as a liquid crystal display (LCD), plasma display panel (PDP), electroluminescent display (ELD), vacuum fluorescent display (VFD), Organic Light Emitting Diode (OLED), and the like have been studied and used.

An OLED panel can display an image by depositing an organic material layer capable of emitting light by itself on a substrate on which a transparent electrode is formed. The OLED panel may have a thin thickness as well as flexible characteristics. The OLED panel having flexible characteristics can display an image while being wound around or unwound from a roller.

Recently, a lot of research has been done on a structural characteristic of a display device having such flexible panels.

DISCLOSURE

Technical Problem

The present disclosure has been made in view of the above problems, and provides a mechanism for stably winding or unwinding a flexible display panel.

The present disclosure further provides a frame structure that can be covered by a display panel or opened.

Technical Solution

According to an aspect of the present disclosure, there is provided a display device including: a flexible display panel; a panel roller which extends long, and around which the display panel is wound, or from which the display panel is unwound; a bottom frame on which the panel roller is rotatably mounted; a first vertical frame which extends long in a direction intersecting a longitudinal direction of the panel roller, and is fixed to the bottom frame; a first lead screw which is parallel to the first vertical frame, and rotatably coupled to the bottom frame; a first support bar located between the first vertical frame and the first lead screw; a first slider which moves in the first lead screw and the support bar, when the first lead screw rotates; and a bar to which a distal end of the display panel is fixed, and which is coupled to the first slider.

Advantageous Effects

According to at least one embodiment of the present disclosure, it may provide a mechanism for stably winding or unwinding the flexible display panel.

According to at least one embodiment of the present disclosure, it may provide a frame structure that can be covered by a display panel or opened.

Further scope of applicability of the present disclosure will become apparent from the detailed description which follows. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as “module” and “unit” may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being “connected with” another element, there may be intervening elements present. In contrast, it will be understood that when an element is referred to as being “directly connected with” another element, there are no intervening elements present.

A singular representation may include a plural representation unless context clearly indicates otherwise.

In the present application, it should be understood that the terms “comprises, includes,” “has,” etc. specify the presence of features, numbers, steps, operations, elements, components, or combinations thereof described in the specification, but do not preclude the presence or addition of one or more other features, numbers, steps, operations, elements, components, or combinations thereof.

Figure 1:
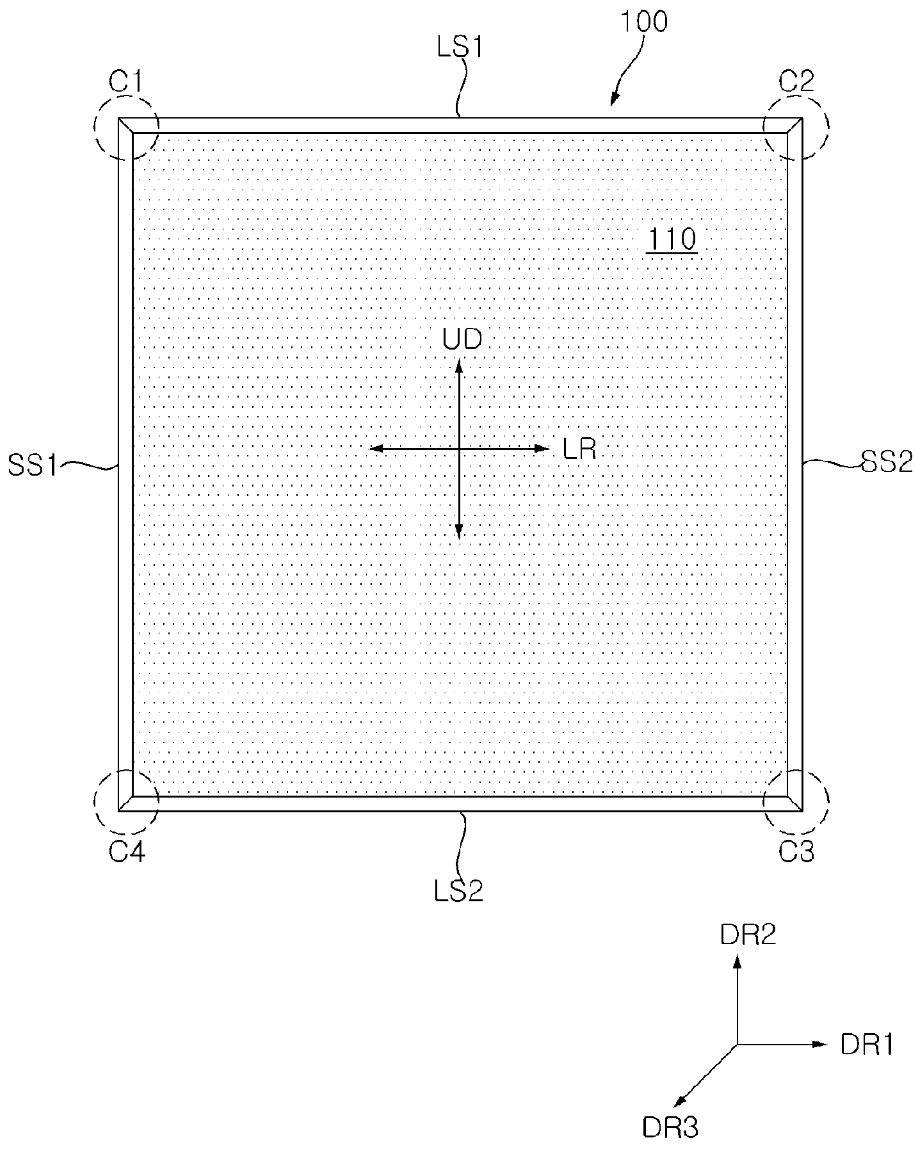
FIGS. 1 to 19 are diagrams illustrating examples of a display device according to embodiments of the present disclosure.

Referring to FIG. 1, a display device may include a first long side LS1, a second long side LS2 opposite the first long side LS1, a first short side SS1 adjacent to the first long side LS1 and the second long side LS2, and a second short side SS2 opposite the first short side SS1.

The first short side area SS1 of the display device may be referred to as a first side area, and the second short side area SS2 of the display device may be referred to as a second side area. The first long side area LS1 of the display device may be referred to as a third side area adjacent to the first side area and the second side area and located between the first side area and the second side area, and the second long side area LS2 of the display device may be referred to as a fourth side area adjacent to the first side area and the second side area, located between the first side area and the second side area, and opposite the third side area.

Although the length of the first and second long sides LS1 and LS2 is shown and described as being greater than the length of the first and second short sides SS1 and SS2 for convenience of description, the length of the first and second long sides LS1 and LS2 may be approximately equal to the length of the first and second short sides SS1 and SS2.

In the following description, a first direction DR1 may be a direction parallel to the long sides LS1 and LS2 of a display device, and a second direction DR2 may be a direction parallel to the short sides SS1 and SS2 of the display device. A third direction DR3 may be a direction perpendicular to the first direction DR1 and/or the second direction DR2.

The first direction DR1 and the second direction DR2 may be referred to as a horizontal direction. Further, the third direction DR3 may be referred to as a vertical direction.

When the display device is seen from the front or the front surface, the first long side portion LS1 may be referred to as an upper side or an upper surface, and the second long side portion LS2 may be referred to as a lower side or a lower surface.

When the display device is seen from the front or the front surface, the first short side portion SS1 may be referred to as a left side or a left surface, and the second short side portion SS2 may be referred to as a right side or a right surface).

The first long side LS1, the second long side LS2, the first short side SS1, and the second short side SS2 may be referred to as edges of the display device. In addition, the points at which the first long side LS1, the second long side LS2, the first short side SS1, and the second short side SS2 join may be referred to as corners.

For example, the point at which the first long side LS1 and the first short side SS1 join may be referred to as a first corner C1, the point at which the first long side LS1 and the second short side SS2 join may be referred to as a second corner C2, the point at which the second short side SS2 and the second long side LS2 join may be referred to as a third corner C3, and the point at which the second long side LS2 and the first short side SS1 join may be referred to as a first corner C4.

A direction from the first short side SS1 to the second short side SS2 or a direction from the second short side SS2 to the first short side SS1 may be referred to as a left-rightward direction LR or a horizontal direction DR1. A direction from the first long side LS1 to the second long side LS2 or a direction from the second long side LS2 to the first long side LS1 may be referred to as an up-downward direction UD or a vertical direction DR2.

Figure 2:
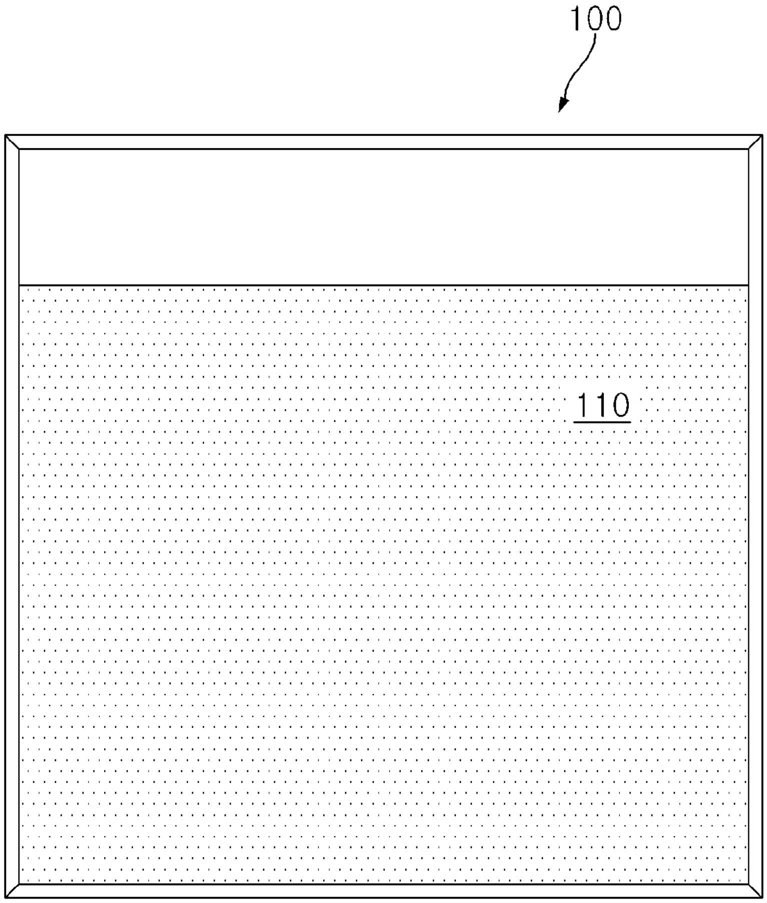
Figure 3:
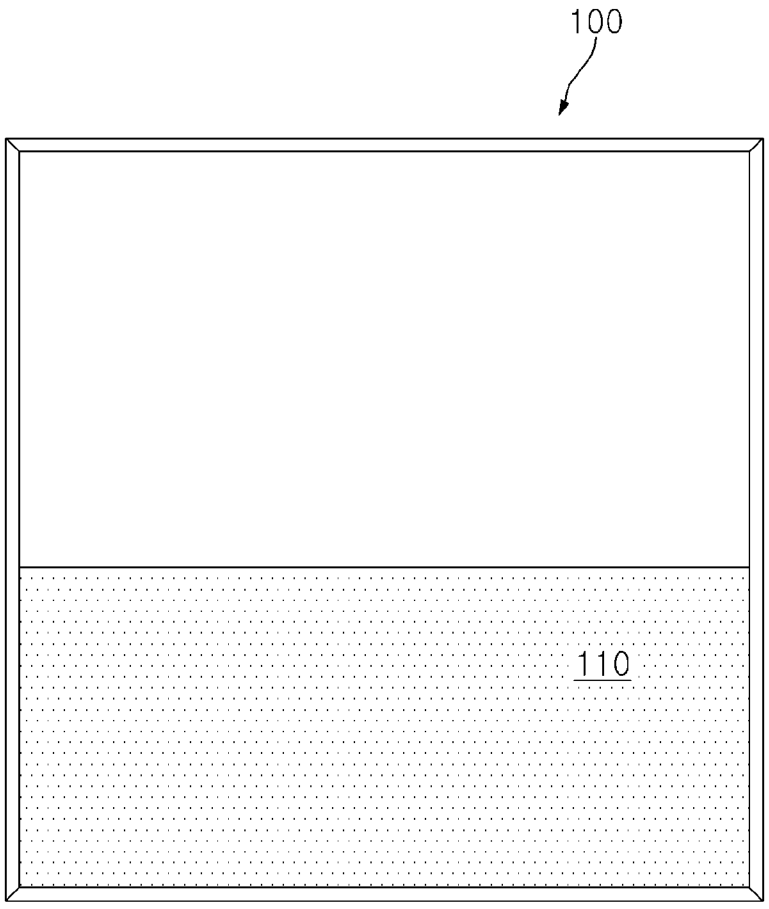

Referring to FIGS. 2 and 3, a display panel 110 may form the front surface of a display device 100, and may move in the vertical direction.

The display panel 110 may cover the front surface of the display device 100 while ascending upward. The display panel 110 may expose the inner side of the display device 100 to the outside while descending downward.

The display panel 110 may cover the front surface of the display device 100 while descending downward. The display panel 110 may expose the inner side of the display device 100 to the outside while ascending upward.

Figure 4:
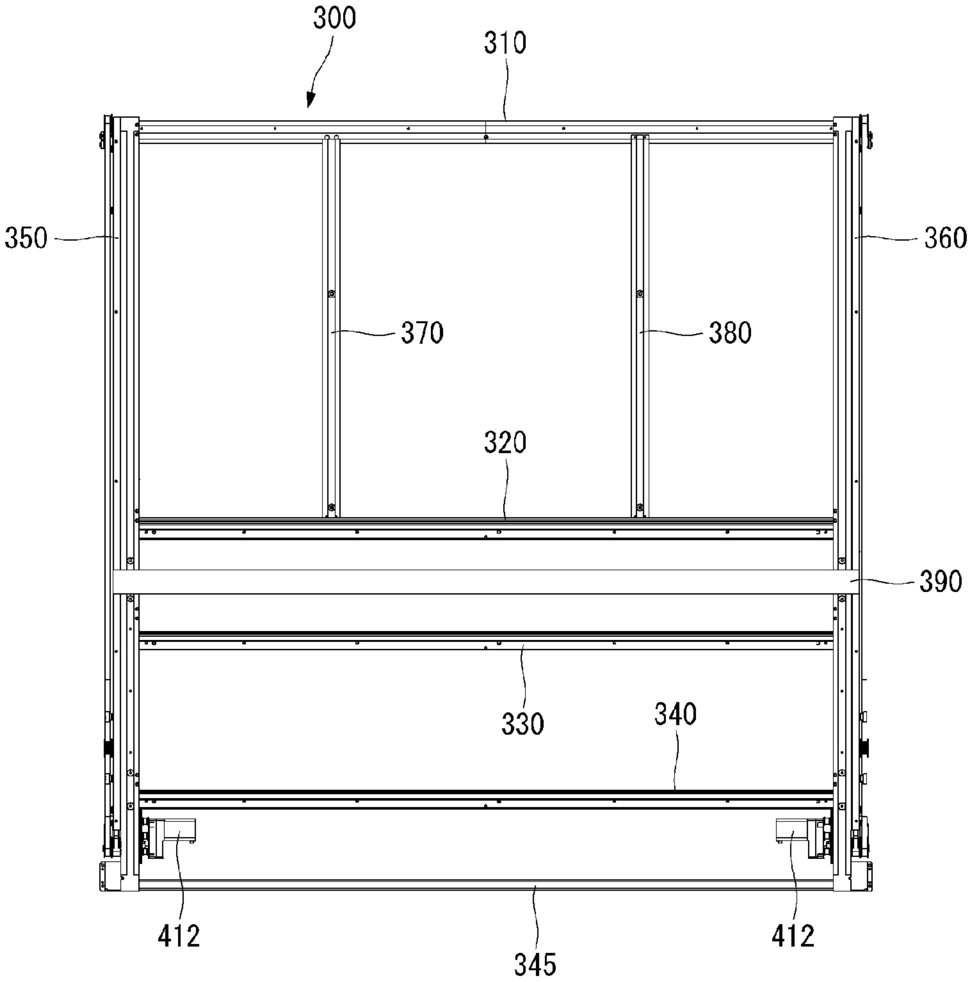
Figure 10:
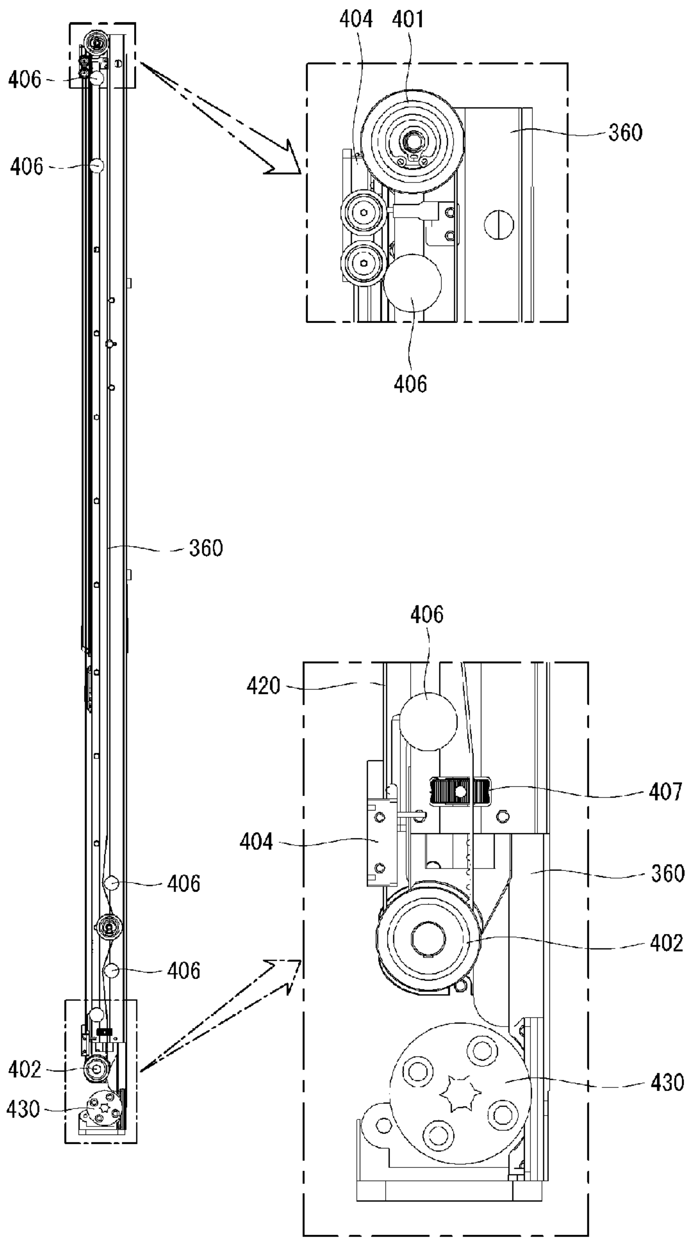

Referring to FIGS. 4 and 10, a frame 300 may form a skeleton of the display device 100 (refer to FIG. 1). The frame 300 may include a horizontal frame 310, 320, 330, and 340, and a vertical frame 350, 360, 370, and 380. There may be a plurality of horizontal frames 310, 320, 330, 340 and 345. There may be a plurality of vertical frames 350, 360, 370, and 380. The frames 300 may be coupled to each other.

A first horizontal frame 310 may be located in the upper side of the display device. A second horizontal frame 320 may be parallel to the first horizontal frame 310, and located below the first horizontal frame 310. A third horizontal frame 330 may be parallel to the second horizontal frame 320, and located below the second horizontal frame 320. A fourth horizontal frame 340 may be parallel to the third horizontal frame 330, and may be located below the third horizontal frame 330.

A first vertical frame 350 may be located in the left side of the first horizontal frame 310 to the fourth horizontal frame 340, and a second vertical frame 360 may be located in the right side of the first horizontal frame 310 to the fourth horizontal frame 340. A third vertical frame 370 and/or a fourth vertical frame 380 may connect the first horizontal frame 310 and the second horizontal frame 320 to each other.

A bar 390 may be elongated from the first vertical frame 350 to the second vertical frame 360, and may move vertically on the front surfaces of the first vertical frame 350 and the second vertical frame 360. A bottom frame 345 may form a lower surface of the display device. The frames 300 may be coupled on the bottom frame 345.

Figure 5:
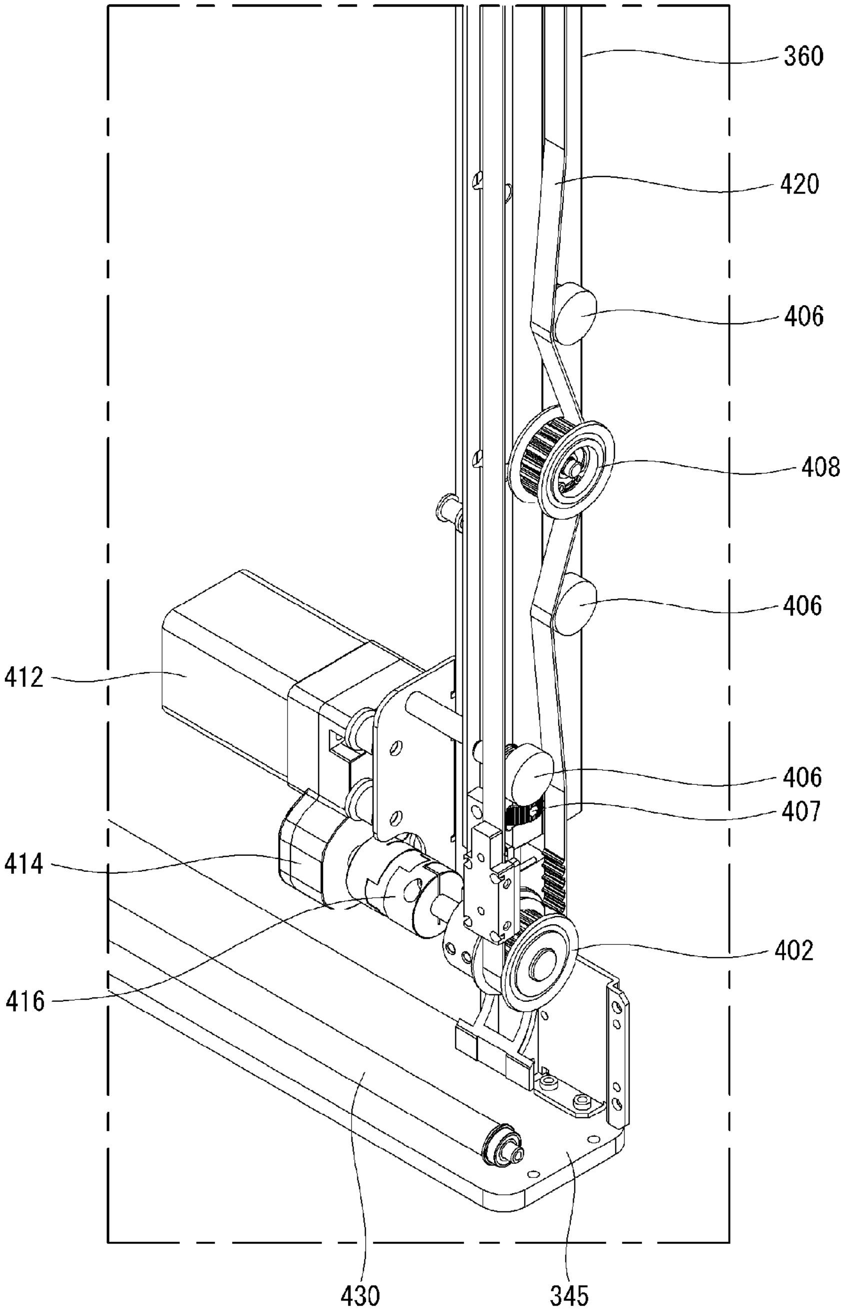

Referring to FIGS. 5 and 10, a motor 412 may be installed in the second vertical frame 360. The motor 412 may provide a rotational force. A gearbox 414 may transmit the rotational force provided by the motor 412. One side of a joint 416 may be connected to the gearbox 414. The rotational force provided from the motor 412 may be transmitted to the joint 416 by adjusting a reduction ratio through the gearbox 414.

A pulley 402 may be rotatably mounted in the second vertical frame 360, while being adjacent to the motor 412. The pulley 402 may be referred to as a lower pulley 402. A pulley 408 may be spaced apart from the lower pulley 402 and installed on the second vertical frame 360. The pulley 408 may be referred to as an intermediate pulley 408. The joint 416 may be connected to the pulley 402 to provide rotational force to the pulley 402. A plurality of tension rollers 406 may be installed along the longitudinal direction of the second vertical frame 360.

A slider 405 may be fixed on a belt 420. The slider 405 may move between the upper end and the lower end of the second vertical frame 360 according to the movement of the belt 420. The sensor 407 may be mounted on the second vertical frame 360 while being adjacent to the lower pulley 402. The sensor 407 may detect the movement of the slider 402. Accordingly, the movement of the display panel 110 (refer to FIGS. 1 to 3) according to the rotation of the belt 420 can be detected. The display panel 110 may be wound around the panel roller 430.

The same configuration and description may be applied to the first vertical frame 350.

Figure 6:
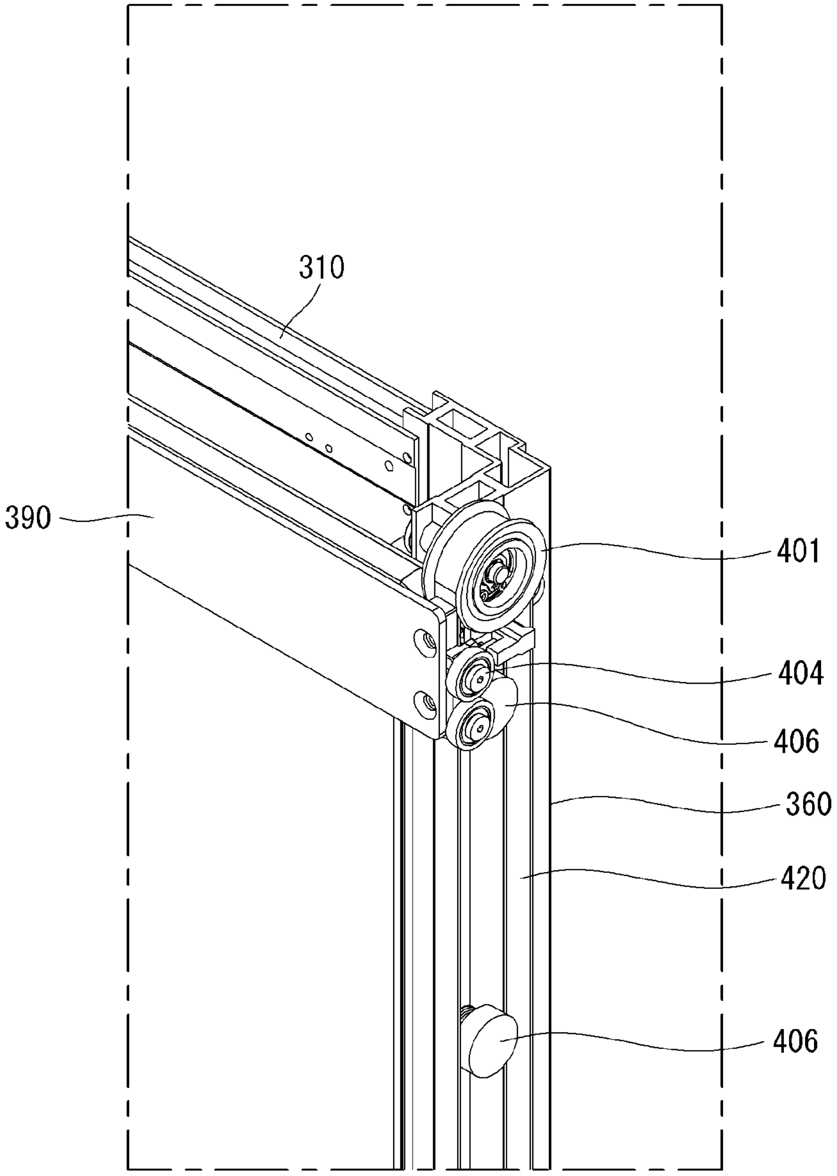

Referring to FIGS. 6 and 10, the pulley 401 may be adjacent to the upper end of the second vertical frame 360 to be rotatably mounted. The pulley 401 may be referred to as an upper pulley 401. A plurality of tension rollers 406 may be installed along the longitudinal direction of the second vertical frame 360. The bar 390 may move on the second vertical frame 360. The guide roller 404 may be installed in one end and/or both ends of the bar 390. The guide roller 404 may move on the second vertical frame 360 together with the bar 390. The upper side of the display panel 110 (refer to FIGS. 1 to 3) may be fixed to the bar 390.

The same configuration and description may be applied to the first vertical frame 350.

Referring to FIGS. 5, 6 and 10, the belt 420 may be caught on the upper pulley 401, the intermediate pulley 408 and/or the lower pulley 402. For example, the belt 420 may be a timing belt. The belt 420 may be caught on the tension roller 406 while being caught on the pulleys 401, 402, and 408 to maintain tension. Accordingly, the belt 420 may maintain a constant tension. The same configuration and description may be applied to the first vertical frame 350.

Figure 7:
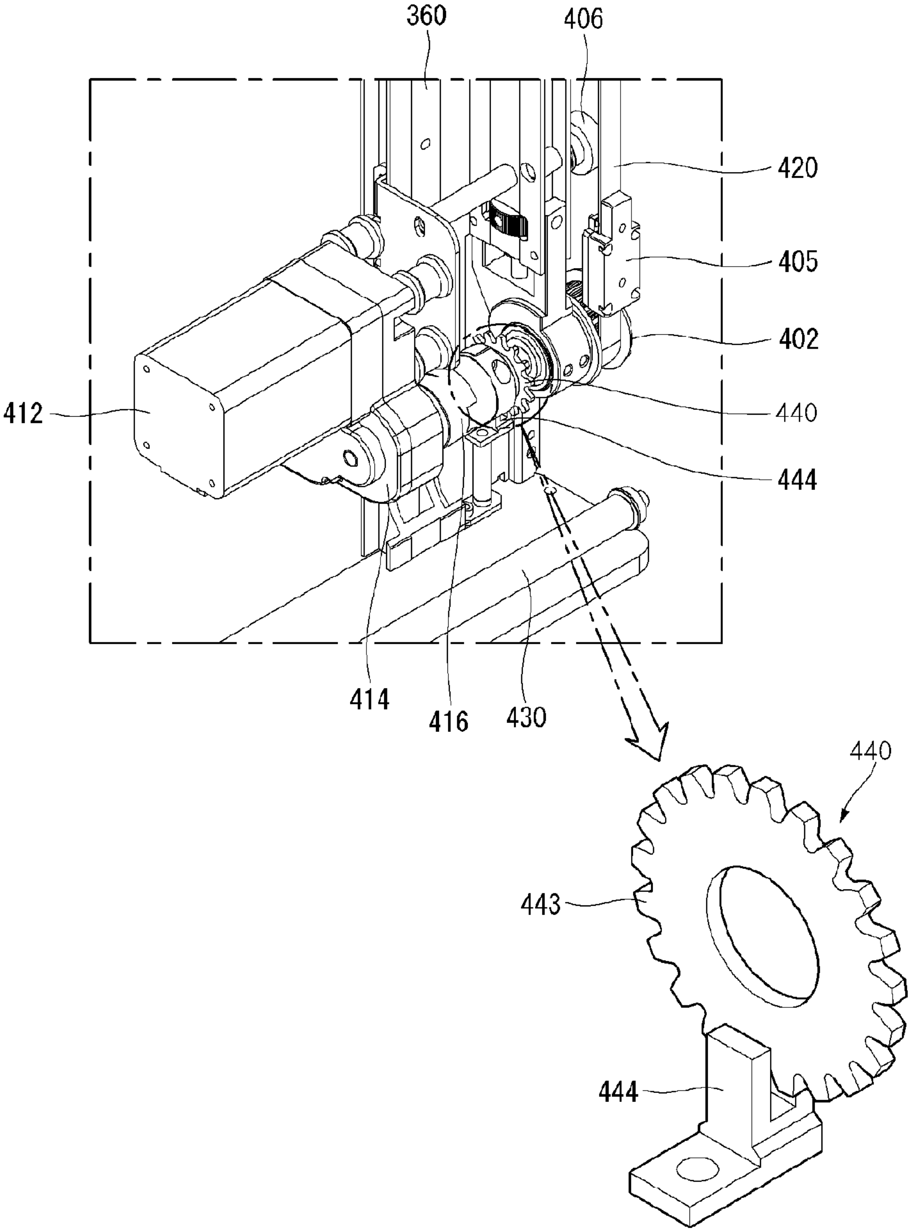

Referring to FIGS. 7 and 10, a rotator 440 may be located between the joint 416 and the pulley 402, and may rotate simultaneously with the rotation of the joint 416 and/or the pulley 402. The rotator 440 may include a plurality of protrusions 443 along the circumference. The sensor 444 may be installed in the second vertical frame 360 while being adjacent to the outer surface of the rotator 440. The sensor 444 may detect the rotation of the rotator 440. The same configuration and description may be applied to the first vertical frame 350. Accordingly, the motors 412 installed in the left and right sides of the frame 300 (refer to FIG. 4) can be synchronized.

Figure 8:
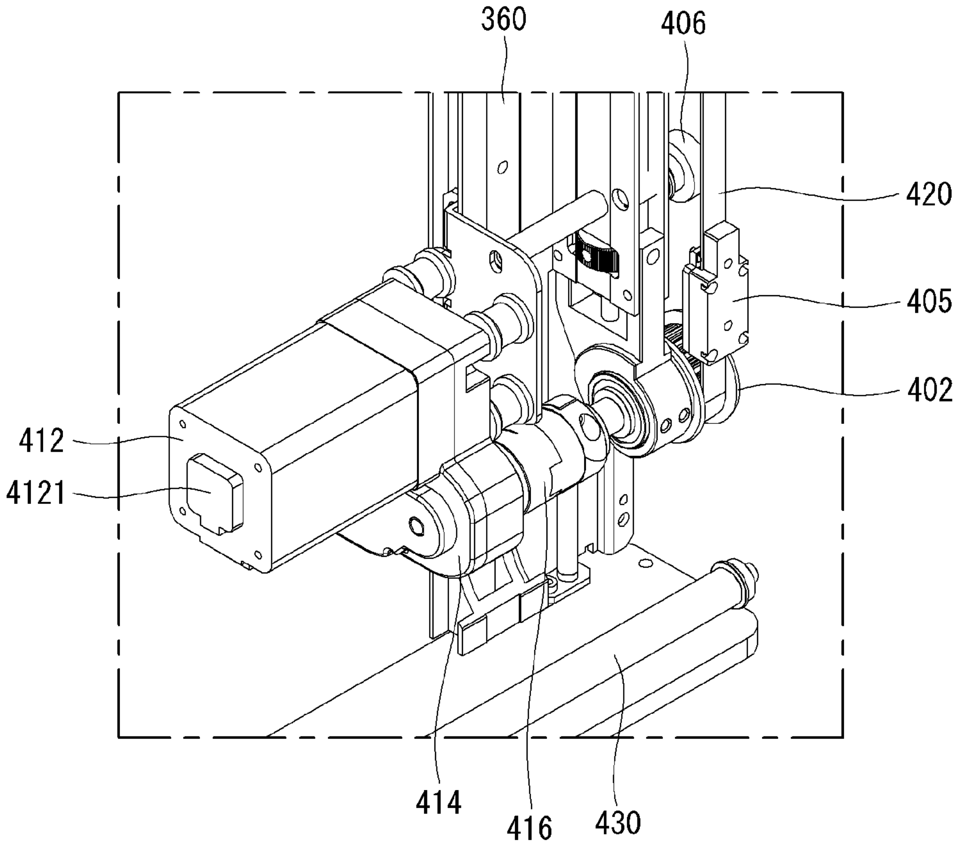

Referring to FIGS. 8 and 10, the motor 412 may be, for example, a step motor. An encoder 4121 may be installed in the motor 412. The encoder 4121 may control the rotation of the motor 412. The same configuration and description may be applied to the first vertical frame 350. Accordingly, the motors 412 installed in the left and right sides of the frame 300 (refer to FIG. 4) can be synchronized.

Figure 9:
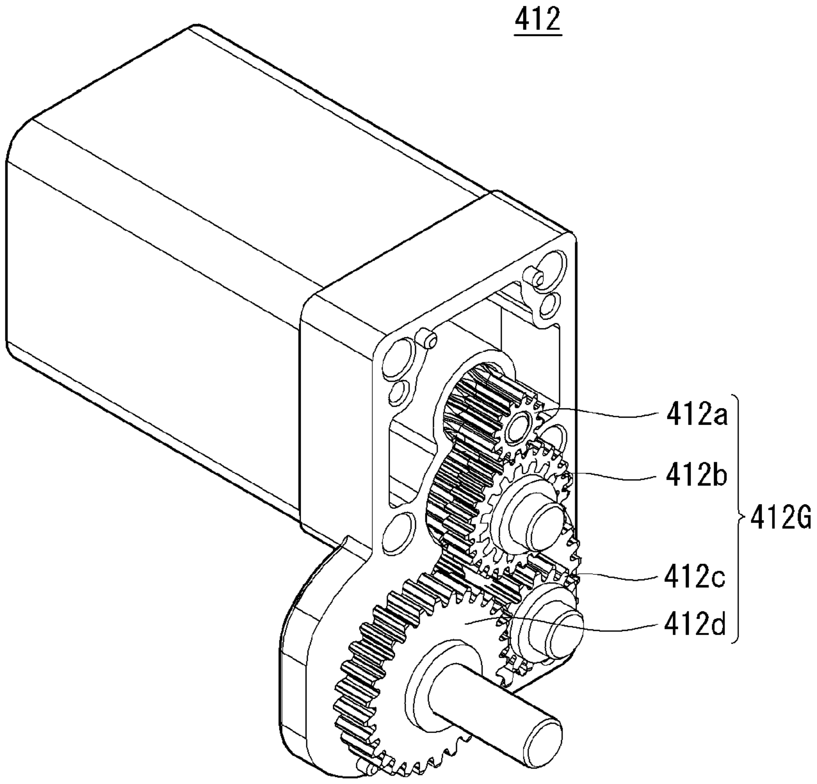

Referring to FIG. 9, the motor 412 may include gears 412G. The gears 412G may include a first gear 412*a*, a second gear 412*b*, a third gear 412*c*, and/or a fourth gear 412*d*. The first gear 412*a* may be connected or fixed to the rotation shaft of the motor 412.

For example, the gear ratio between the first gear 412*a* and the second gear 412*b* may be 2.08. As another example, the gear ratio between the second gear 412*b* and the third gear 412*c* may be 1.87. As another example, the gear ratio between the third gear 412*c* and the fourth gear 412*d* may be 1.87. The reduction ratio of the first gear 412*a* to the fourth gear 412*d* may be, for example, 7.2. The reduction ratio of the first gear 412*a* to the fourth gear 412*d* may be 6 to 8.

Figure 11:
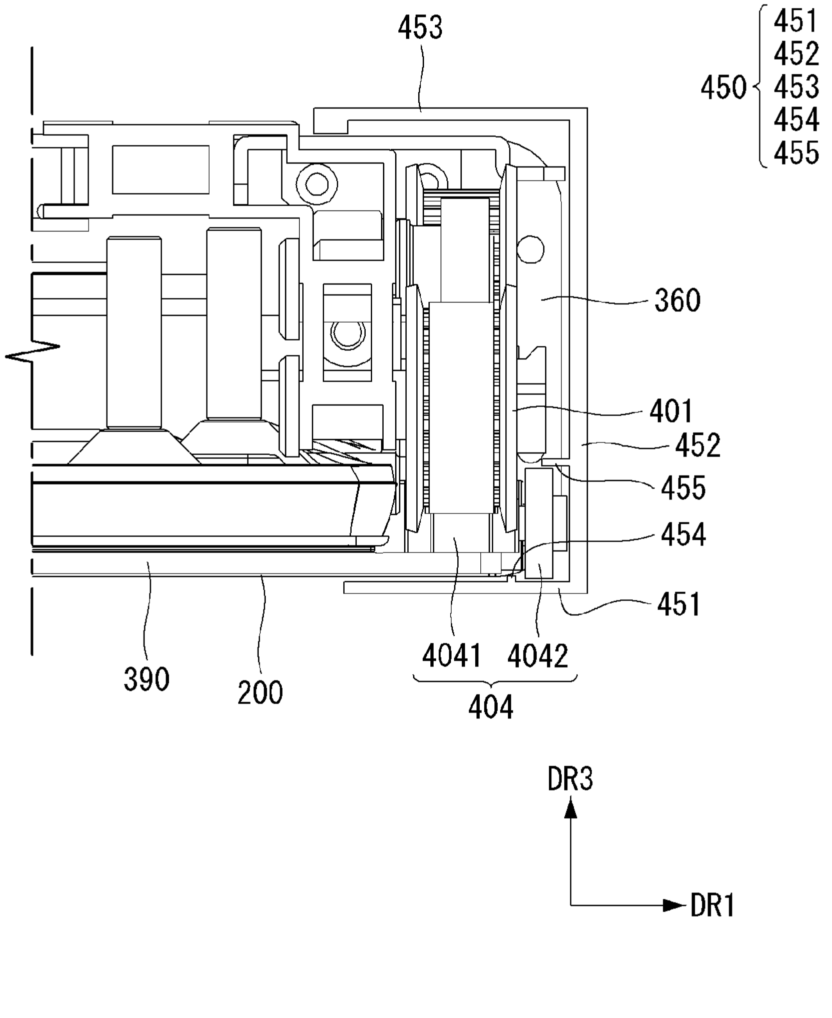

Referring to FIG. 11, the side cover 450 may cover the outer surface of the second vertical frame 360. The side cover 450 may include a first part 451, a second part 452, and a third part 453. The first part 451 may extend in a first direction DR1. The second part 452 may extend in a third direction DR3, and may be connected to the first part 451. The third part 453 may extend in the first direction DR1 and may be connected to the second part 452. The first part 451 may cover a part of the front surface of the bar 390. The second part 452 may cover the outer surface of the second vertical frame 360. The third part 453 may be located in the rear of the second vertical frame 360.

The side cover 450 may include guide ribs 454 and 455. The guide ribs 454 and 455 may be adjacent to the guide roller 404 to protrude to the inner side of the first part 451 and/or the second part 452. Accordingly, the movement of the bar 390 and the display panel 110 may be guided. The same configuration and description may be applied to the first vertical frame 350.

Figure 12:
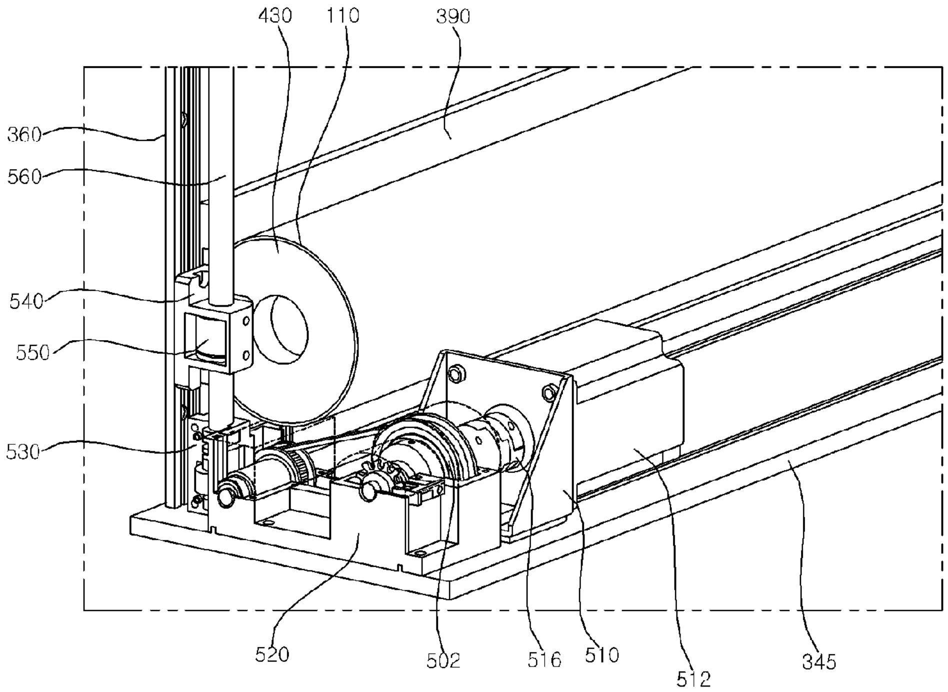

Referring to FIG. 12, a bracket 510 may be mounted on the bottom frame 345. The bracket 510 may be referred to as a motor bracket 510. The motor 512 may be located on the bottom frame 345 and may be fixed to the bracket 510. A pulley mount 520 may be mounted on the bottom frame 345. The pulley mount 520 may be located adjacent to the motor 512. The bracket 510 may be located between the pulley mount 520 and the motor 512.

The pulley 502 may be mounted on the pulley mount 520. The pulley 502 may rotate on the pulley mount 520. A joint 516 may connect the pulley 502 and the rotation shaft of the motor 512. The motor 512 may transmit power to pulley 502 via the joint 516. The pulley 502 may be referred to as a first pulley 502.

A lead screw 560 may be located parallel to the vertical frame 360. The lead screw 560 may be rotatably installed in the bottom frame 345. A screw mount 530 may be mounted on the bottom frame 345 while being adjacent to the vertical frame 360. The lead screw 560 may be rotatably coupled to the screw mount 530.

The lead screw 560 may be inserted into a slider 540. The slider 540 may move in the vertical direction of the lead screw 560. The slider 540 may move vertically while being in contact with the vertical frame 360. The bar 390 may be connected to or coupled to the slider 540. The slider 540 may move vertically in the lead screw 560 together with the bar 390.

A screw nut 550 may be coupled to the slider 540. The screw nut 550 may have a cylindrical shape and may have threads on its inner circumferential surface. The threads of the screw nut 550 may be engaged with threads formed on the outer circumferential surface of the lead screw 560. When the lead screw 560 rotates, the slider 540 may move in the vertical direction of the lead screw 560 by the screw nut 550.

Figure 13:
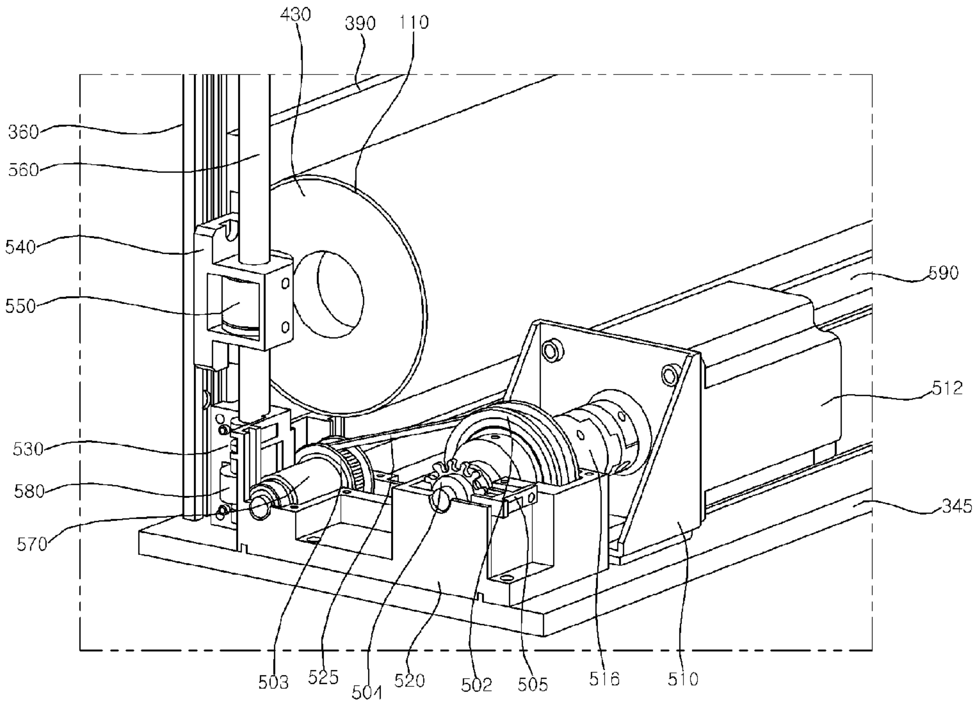

Referring to FIG. 13, an indicator 504 may be coupled to the rotation shaft of the first pulley 502. The indicator 504 may rotate with the first pulley 502. The sensor 505 may be mounted on the pulley mount 520 while being adjacent to the indicator 504. The sensor 505 may detect the rotation of the indicator 504.

The second pulley 503 may be spaced apart from the first pulley 502 to be mounted on the pulley mount 520. A diameter of the second pulley 503 may be smaller than a diameter of the first pulley 502. The belt 525 may connect the first pulley 502 and the second pulley 503. The belt 525 may contact the outer circumferential surface of the first pulley 502 and the outer circumferential surface of the second pulley 503. When the first pulley 502 rotates, the second pulley 503 may also rotate by the belt 525.

A transmission shaft 590 may be inserted into the second pulley 503, and rotatably installed on the pulley mount 520. The transmission shaft 590 may be fixed to the second pulley 503 and rotate together with the second pulley 503. The transmission shaft 590 may be inserted into a worm 570. The worm 570 may be installed on the pulley mount 520 while being adjacent to the screw mount 530. A worm gear 580 may be fixed to the lower end of the lead screw 560. The worm gear 580 may be engaged with the worm 570.

Accordingly, the rotational force provided by the motor 512 may be transmitted to the lead screw 560 through the first pulley 502, the belt 525, the second pulley 503, the worm 570, and the worm gear 580.

Figure 14:
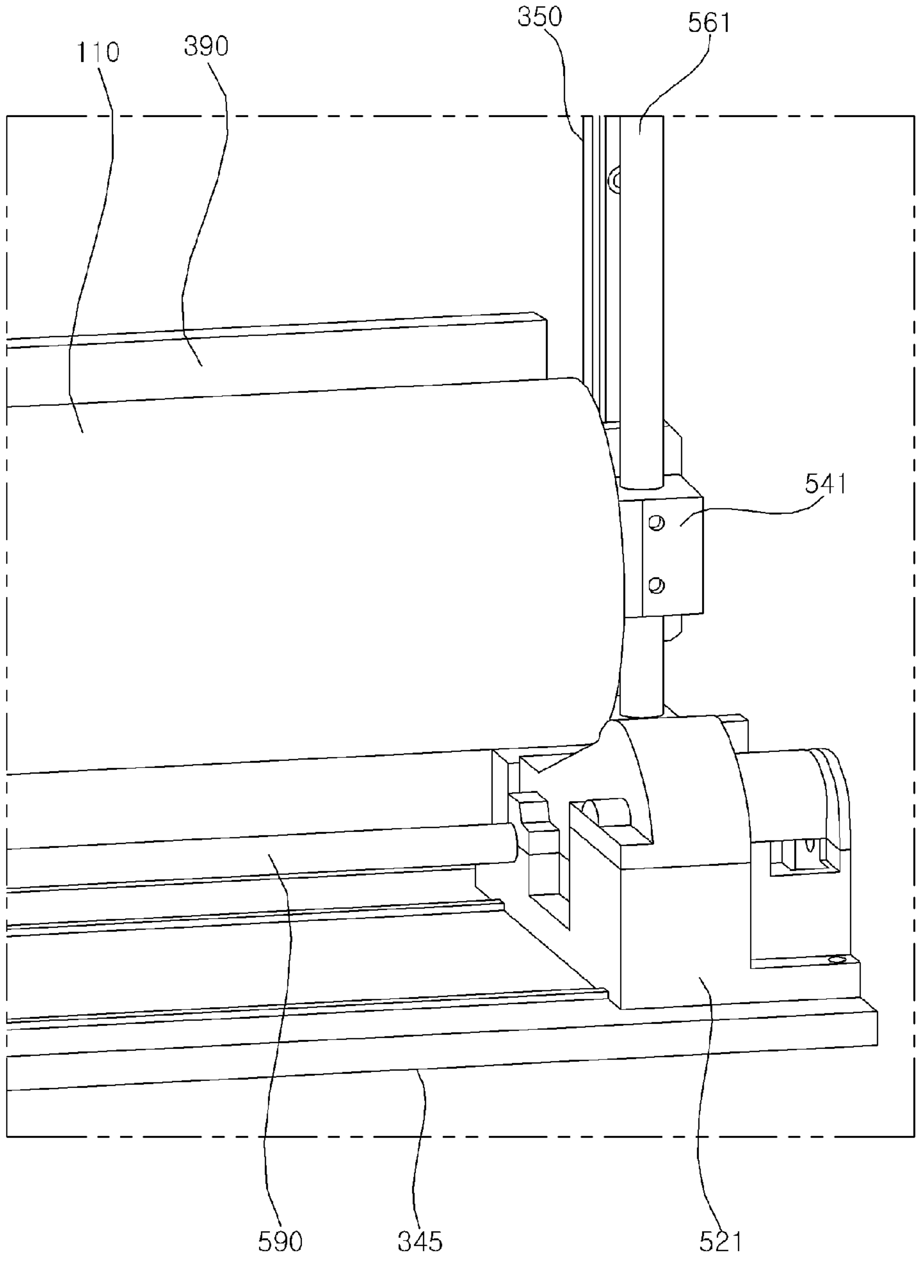

Referring to FIG. 14, the lead screw 561 may be located parallel to the vertical frame 350. The lead screw 561 may be rotatably installed on the bottom frame 345.

The lead screw 561 may be inserted into the slider 541. The slider 541 may move in the vertical direction of the lead screw 561. The slider 541 may move vertically while being in contact with the vertical frame 350. The bar 390 may be connected to or coupled to the slider 541. The slider 541 may move vertically in the lead screw 561 together with the bar 390.

The gearbox 521 may be mounted on the bottom mount 345. The gearbox 521 may connect the transmission shaft 590 and the lead screw 561. For example, the gearbox 521 may include a worm gear. The worm gear may transmit the rotational force of the transmission shaft 590 to the lead screw 561 to rotate the lead screw 561.

Figure 15:
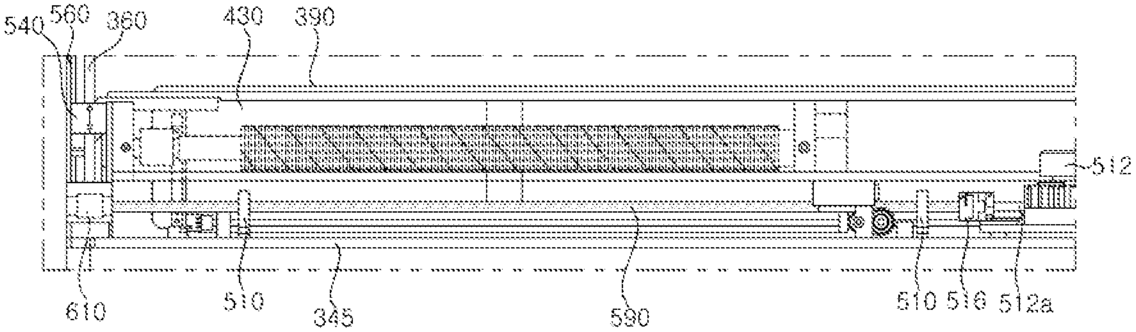

Referring to FIG. 15, the panel roller 430 may be rotatably mounted on the bottom frame 345. The second vertical frame 360 may be located adjacent to a distal end of the panel roller 430, and may be fixed to the bottom frame 345. The motor 512 may be mounted on the bottom frame 345 while being adjacent to the center of the bottom frame 345 or adjacent to the center of the panel roller 430.

The transmission shaft 590 may extend long in the longitudinal direction of the bottom frame 345. The transmission shaft 590 may be supported by the brackets 510 to rotate in the bottom frame 345. The motor 512 may provide a rotational force to the transmission shaft 590. The motor shaft 512*a* may protrude to one side of the motor 512 to be rotated. The joint 516 may connect the motor shaft 512*a* and the transmission shaft 590. The joint 516 may transmit the rotational force of the motor shaft 512*a* to the transmission shaft 590.

The vertical frame 360 may be fixed to the bottom frame 345 while being adjacent to one end of the bottom frame 345. The vertical frame 360 may be located adjacent to the distal end of the panel roller 430. The lead screw 560 may be located parallel to the vertical frame 360. The lead screw 560 may be rotatably installed in the vertical frame 360 and/or the bottom frame 345.

The bar 390 may move vertically in the vertical frame 360. The bar 390 may be located in parallel with the panel roller 430. The slider 540 may move on the lead screw 560 in the longitudinal direction of the lead screw 560. For example, when the lead screw 560 rotates, the slider 540 may move in the lead screw 560. The bar 390 may be fixed to the slider 540.

The gearbox 610 may be located between the transmission shaft 590 and the lead screw 560. The gearbox 610 may transmit the rotational force of the transmission shaft 590 to the lead screw 560. For example, the gearbox 610 may include a worm gear. Accordingly, when the motor 512 rotates, the transmission shaft 590, the gearbox 610, and the lead screw 560 rotate. Further, the bar 390 moves vertically while the slider 540 moves on the lead screw 560.

Figure 16:
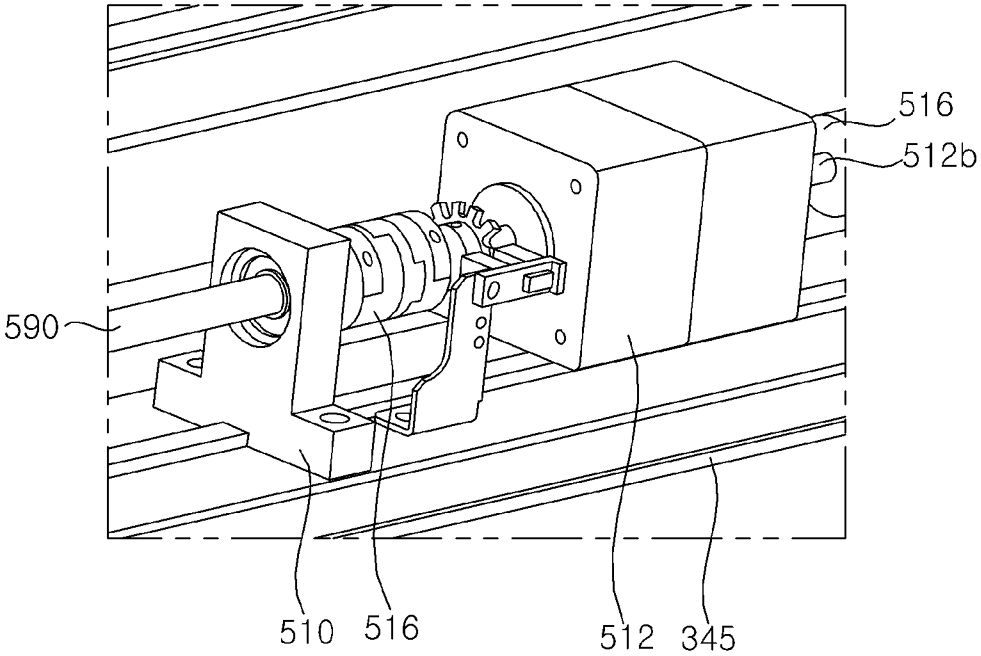
Figure 17:
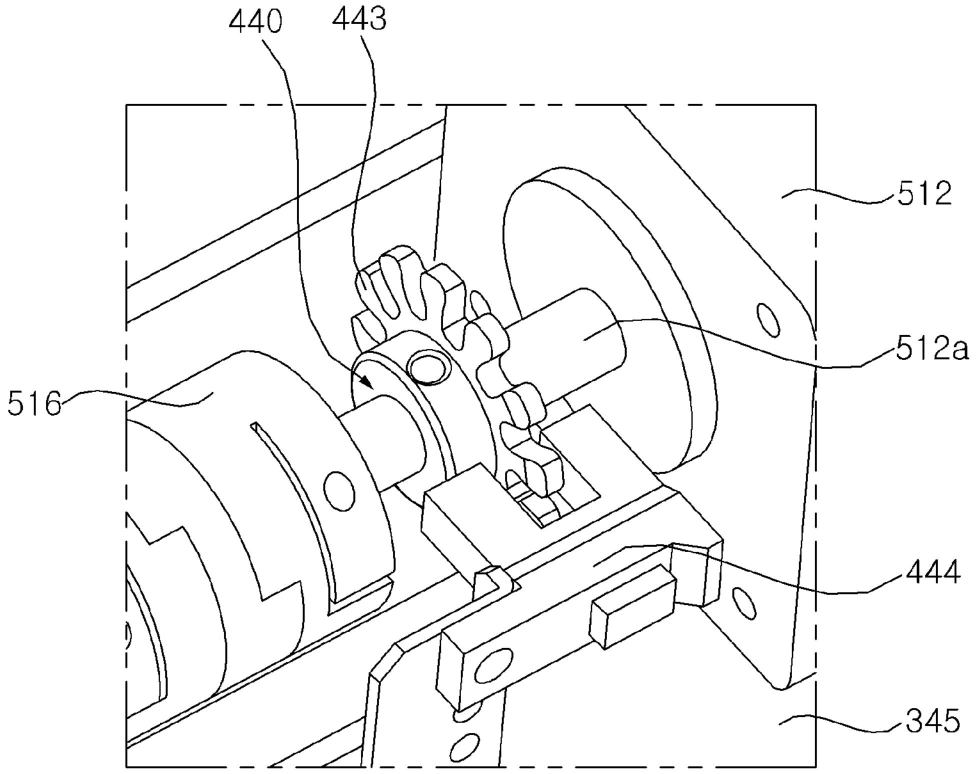

Referring to FIGS. 16 and 17, the motor 512 may include a plurality of motor shafts 512*a* and 512*b*. The rotation of the motor 512 may be distributed and transmitted to both sides of the motor 512. A first motor shaft 512*a* may be connected to a first joint 516. A second motor shaft 512*b* may be connected to a second joint 516. The rotator 440 may be fixed to the first motor shaft 512*a*. When the first motor shaft 512*a* rotates, the rotator 440 may also rotate. The rotator 440 may include a plurality of protrusions 443. For example, the rotator 440 may be a disk, and the plurality of protrusions 443 may be formed on the outer circumferential surface of the rotator 440. The sensor 444 may be located adjacent to the rotator 440. The sensor 444 may detect the rotation of the rotator 440.

Figure 18:
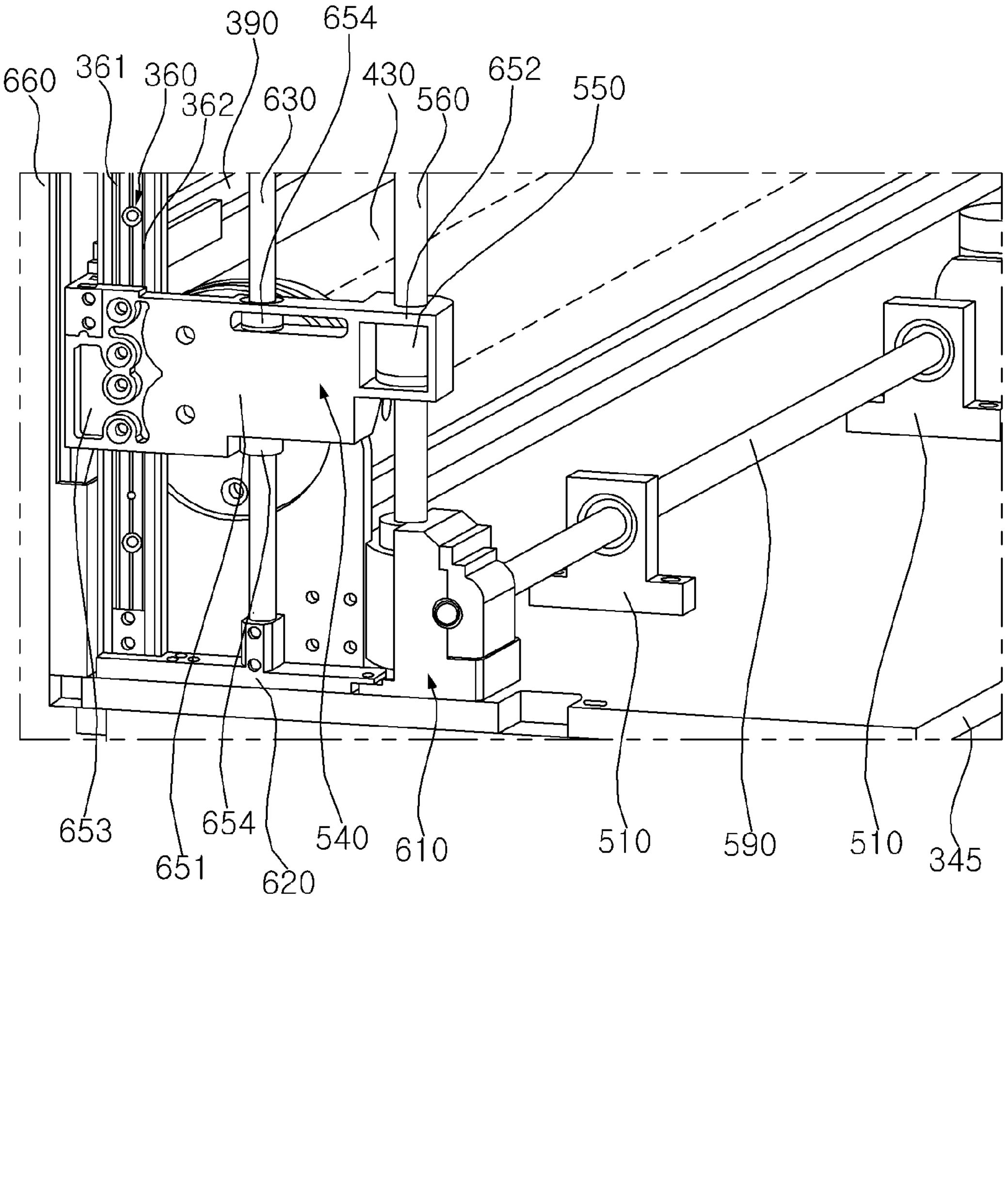
Figure 19:
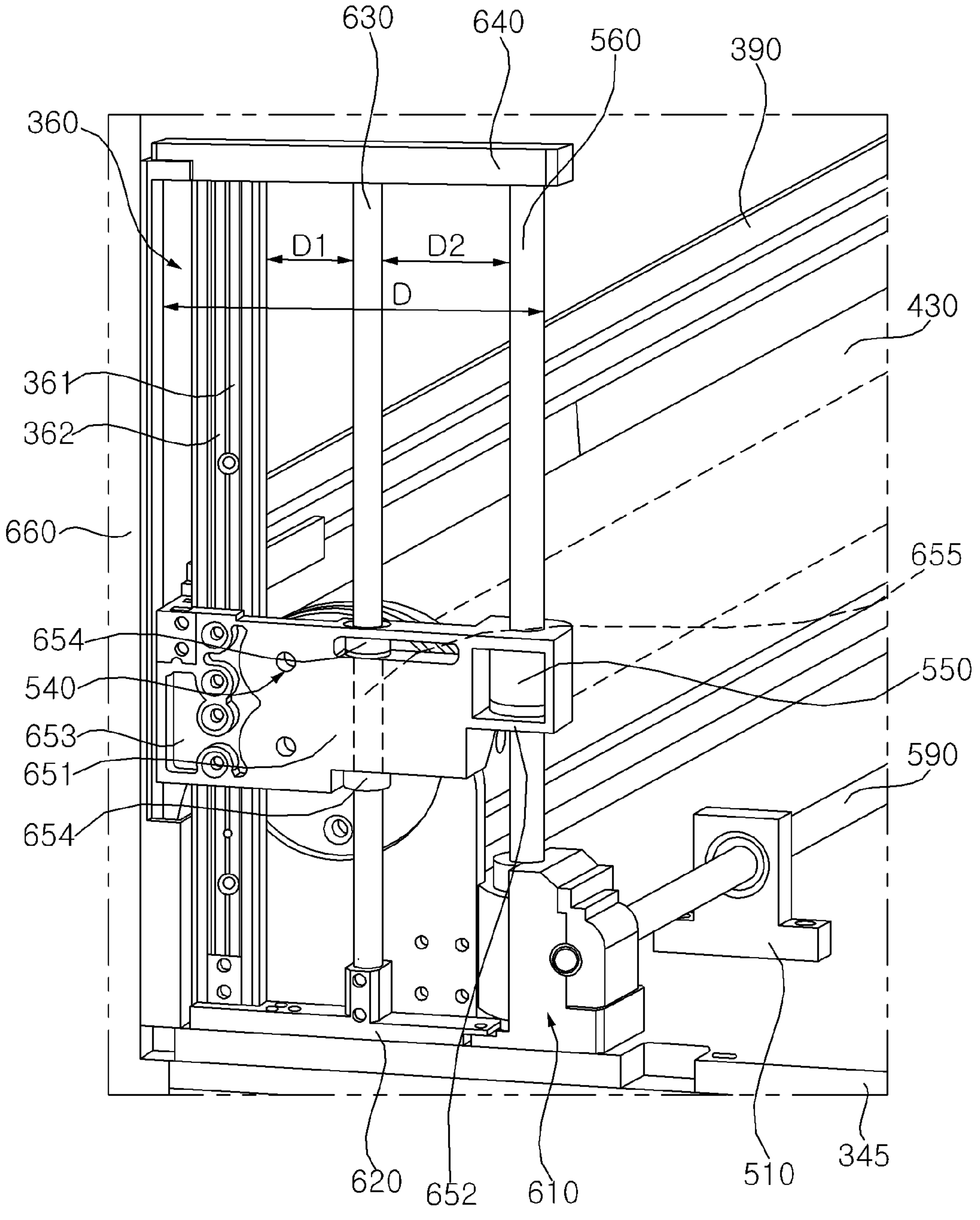

Referring to FIGS. 18 and 19, a base 620 may be fixed on the bottom frame 345. The base 620 may extend long in the width direction of the bottom frame 345. The base 620 may be located on an upper surface of the bottom frame 345 while being adjacent to one end of the bottom frame 345. The vertical frame 360 may be fixed to the base 620. A support bar 630 may be adjacent to the vertical frame 360 and located in parallel with the vertical frame 360. The lead screw 560 may be rotatably mounted on the base 620 or the bottom frame 345. The support bar 630 may be located between the vertical frame 360 and the lead screw 560.

A top block 640 may be fixed on the vertical frame 360 and/or the support bar 630. The lead screw 560 may be rotatably installed on the top block 640. A front frame 660 may connect the bottom frame 345 and the top block 640.

The vertical frame 360 may include a rail 361, 362. There may be a plurality of rails 361 and 362. The rails 361 and 362 may be formed to be elongated in the vertical direction on the side surface of the vertical frame 360. The slider 540 may move on the vertical frame 360, the support bar 630, and/or the lead screw 560.

The slider 540 may include a body 651, a tunnel 655, a rail mover 653, and a nut holder 652. The body 651 may extend long in the longitudinal direction of the base 620 and may be a plate-shaped block as a whole. The tunnel 655 may be formed by vertically penetrating the body 651 in the height direction of the body 651. The support bar 630 may be inserted into the tunnel 655. For example, the diameter of the support bar 630 may be substantially the same as the diameter of the tunnel 655. As another example, the diameter of the support bar 630 may be smaller than the diameter of the tunnel 655. Rings 654 may be coupled to both ends of the tunnel 655. For example, the inner diameter of the rings 654 may be substantially the same as the outer diameter of the support bar 630. The rings 654 may suppress vibration that can occur between the support bar 630 and the tunnel 655.

The screw nut 550 may be coupled to the nut holder 652. The screw nut 550 may be fixed to the nut holder 652 without rotating with respect to the body 651. Accordingly, when the lead screw 560 rotates, the screw nut 550 may move vertically in the lead screw 560.

The rail mover 653 may move on the rail 361, 362 of the vertical frame 360. The rail mover 653 may be coupled to the rail 361, 362. The rail mover 653 may be formed on one side of the body 651. The rail mover 653 may face the nut holder 652 with respect to the body 651. The bar 390 may be fixed to the rail mover 653 or the body 651.

The slider 540 may move on the vertical frame 360, the support bar 630, and the lead screw 560. A load may be applied to the slider 540 by the bar 390 while the slider 540 moves upward by the screw nut 550. When a load is applied to the slider 540 by the bar 390, a large load may be concentrated on the screw nut 550. Due to the coupling of the tunnel 655 and the support bar 630, the concentration of the load on the screw nut 550 can be eliminated. In addition, the rail mover 653 is engaged with the rail 361, 362 of the vertical frame 360 and moves in the vertical frame 360, thereby preventing the load from being concentrated on the screw nut 550. Accordingly, the slider 540 can move smoothly in the vertical direction despite the concentration of the load applied to the slider 540 by the bar 390.

For example, the distance D1 between the vertical frame 360 and the support bar 630 may be smaller than the distance D2 between the support bar 630 and the lead screw 560. As another example, the distance D between the vertical frame 360 and the lead screw 560 may be greater than the diameter of the panel roller 430. Accordingly, the rotation driving mechanism of the panel roller 430 can be implemented in a narrow space, and stable driving can be implemented as well.

According to an aspect of the present disclosure, provided is a display device including: a flexible display panel; a panel roller which extends long, and around which the display panel is wound, or from which the display panel is unwound; a bottom frame on which the panel roller is rotatably mounted; a first vertical frame which extends long in a direction intersecting a longitudinal direction of the panel roller, and is fixed to the bottom frame; a first lead screw which is parallel to the first vertical frame, and rotatably coupled to the bottom frame; a first support bar located between the first vertical frame and the first lead screw; a first slider which moves in the first lead screw and the support bar, when the first lead screw rotates; and a bar to which a distal end of the display panel is fixed, and which is coupled to the first slider.

In addition, according to another aspect of the present disclosure, the display device further includes a first screw nut into which the first lead screw is inserted, and which is engaged with a thread of the first lead screw, wherein the first slider is coupled to the first screw nut, and moves in a longitudinal direction of the first lead screw while being in contact with the first vertical frame.

In addition, according to another aspect of the present disclosure, the display device further includes a motor mounted on the bottom frame; a first worm gear which is located adjacent to a lower end of the first lead screw, and rotates the first lead screw; and a first transmission shaft for transmitting a rotational force of the motor to the first worm gear.

In addition, according to another aspect of the present disclosure, the display device further includes a rotator rotating together with the first transmission shaft; and a sensor for detecting the rotation of the rotator.

In addition, according to another aspect of the present disclosure, the display device further includes a second vertical frame which is parallel to the first vertical frame, and fixed to the bottom frame; a second lead screw which is parallel to the second vertical frame, and rotatably coupled to the bottom frame; a second support bar located between the second vertical frame and the second lead screw; a second slider which moves in the second lead screw and the second support bar, when the second lead screw rotates, wherein the bar has one side fixed to the first slider and the other side fixed to the second slider.

In addition, according to another aspect of the present disclosure, the display device further includes a second screw nut into which the second lead screw is inserted, and which is engaged with a thread of the second lead screw, wherein the second slider is coupled to the second screw nut, and moves in a longitudinal direction of the second lead screw while being in contact with the second vertical frame.

In addition, according to another aspect of the present disclosure, the display device further includes a second worm gear which is located adjacent to a lower end of the second lead screw, and rotates the second vertical frame; and a second transmission shaft for transmitting rotational force of the motor to the second worm gear, wherein the first transmission shaft is opposite to the second transmission shaft with respect to the motor.

The first slider includes: a body having a tunnel through which the first support bar passes; a nut holder which extends from the body, and is coupled to the first screw nut; and a rail mover which extends from the body, and is in contact with the first vertical frame, wherein the first vertical frame includes rails engaged with the rail mover.

The slider further includes a ring located in at least one end of the tunnel, wherein an inner diameter of the ring is substantially equal to an outer diameter of the support bar.

A distance between the first vertical frame and the support bar is smaller than a distance between the support bar and the lead screw.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
- a flexible display panel;
- a panel roller elongated, the panel roller winding up and unwinding the display panel;
- a bottom frame on which the panel roller is rotatably mounted;
- a first vertical frame extending in a direction intersecting a longitudinal direction of the panel roller, and fixed to the bottom frame;
- a first lead screw being parallel to the first vertical frame, and rotatably coupled to the bottom frame;
- a first support bar located between the first vertical frame and the first lead screw;
- a first slider which moves on the first lead screw and the support bar, when the first lead screw rotates; and
- a bar to which a distal end of the display panel is fixed, and the bar is coupled to the first slider.

2. The display device of claim 1, further comprising a first screw nut into which the first lead screw is inserted, the first screw nut engaged with a thread of the first lead screw,
- wherein the first slider is coupled to the first screw nut, and moves in a longitudinal direction of the first lead screw with contacting with the first vertical frame.

3. The display device of claim 2, further comprising:
- a motor mounted on the bottom frame;
- a first worm gear located adjacent to a lower end of the first lead screw, and rotating the first lead screw; and
- a first transmission shaft for transmitting a rotational force of the motor to the first worm gear.

4. The display device of claim 3, further comprising:

a rotator rotating together with the first transmission shaft; and a sensor for detecting the rotation of the rotator.

5. The display device of claim 4, further comprising:

a second vertical frame being parallel to the first vertical frame, and fixed to the bottom frame;

a second lead screw being parallel to the second vertical frame, and rotatably coupled to the bottom frame;

a second support bar located between the second vertical frame and the second lead screw;

a second slider which moves on the second lead screw and the second support bar, when the second lead screw rotates, wherein the bar has one side fixed to the first slider and the other side fixed to the second slider.

6. The display device of claim 5, further comprising: a second screw nut into which the second lead screw is inserted, the second screw nut engaged with a thread of the second lead screw, wherein the second slider is coupled to the second screw nut, and moves in a longitudinal direction of the second lead screw with contacting with the second vertical frame.

7. The display device of claim 6, further comprising:

a second worm gear located adjacent to a lower end of the second lead screw, and rotating the second vertical frame; and a second transmission shaft for transmitting rotational force of the motor to the second worm gear, wherein the first transmission shaft is opposite to the second transmission shaft with respect to the motor.

8. The display device of claim 7, wherein the first slider comprises:

a body having a tunnel through which the first support bar passes;

a nut holder extending from the body, and coupled to the first screw nut; and a rail mover extending from the body, and being in contact with the first vertical frame, wherein the first vertical frame comprises rails engaged with the rail mover.

9. The display device of claim 8, wherein the slider further comprises a ring located in at least one end of the tunnel, wherein an inner diameter of the ring is substantially equal to an outer diameter of the support bar.

10. The display device of claim 1, wherein a distance between the first vertical frame and the first support bar is smaller than a distance between the first support bar and the first lead screw.

* * * * *